(12) United States Patent
Mochizuki et al.

(10) Patent No.: US 10,218,521 B2
(45) Date of Patent: Feb. 26, 2019

(54) CONFERENCING SYSTEM

(71) Applicants: Toshihiro Mochizuki, Kanagawa (JP); Jun Ebata, Tokyo (JP)

(72) Inventors: Toshihiro Mochizuki, Kanagawa (JP); Jun Ebata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 256 days.

(21) Appl. No.: 15/071,305

(22) Filed: Mar. 16, 2016

(65) Prior Publication Data
US 2016/0277345 A1 Sep. 22, 2016

(30) Foreign Application Priority Data

Mar. 20, 2015 (JP) .................................. 2015-058023

(51) Int. Cl.
*H04L 29/06* (2006.01)
*H04L 12/18* (2006.01)

(52) U.S. Cl.
CPC ...... *H04L 12/1827* (2013.01); *H04L 12/1822* (2013.01)

(58) Field of Classification Search
USPC ........................................................ 709/207
See application file for complete search history.

(56) References Cited

U.S. PATENT DOCUMENTS

| | | | |
|---|---|---|---|
| 2004/0003104 A1* | 1/2004 | Boskovic | H04L 29/06 709/231 |
| 2007/0100938 A1* | 5/2007 | Bagley | G06Q 10/10 709/204 |
| 2007/0297643 A1 | 12/2007 | Uehori et al. | |
| 2008/0034104 A1* | 2/2008 | Kariti | G06G 10/10 709/231 |
| 2011/0320976 A1* | 12/2011 | Piersol | G06F 3/0483 715/810 |
| 2012/0092438 A1* | 4/2012 | Guzman Suarez | H04N 7/15 348/14.03 |
| 2013/0246534 A1* | 9/2013 | Chebiyyam | G06F 15/16 709/206 |
| 2016/0055676 A1* | 2/2016 | Kasahara | G06T 19/006 345/633 |

FOREIGN PATENT DOCUMENTS

| | | |
|---|---|---|
| JP | 2006-091938 | 4/2006 |
| JP | 2007-219161 | 8/2007 |
| JP | 2008-003968 | 1/2008 |
| JP | 2010-033229 | 2/2010 |
| JP | 2012-073898 | 4/2012 |

* cited by examiner

*Primary Examiner* — Vivek Srivastava
*Assistant Examiner* — Hien V Doan
(74) *Attorney, Agent, or Firm* — IPUSA, PLLC

(57) ABSTRACT

A conferencing system includes at least one first information terminal, a second information terminal, and an information processing apparatus. The information processing apparatus includes a receiving unit configured to receive a first display position corresponding to a current display position of content data displayed by the first information terminal. The second information terminal includes a display unit configured to display the content data and the first display position.

10 Claims, 12 Drawing Sheets

FIG.2

| TERMINAL ID | USER ID | USER TYPE | DISPLAY MODE | DISPLAY POSITION (PAGE NUMBER, ETC.) |
|---|---|---|---|---|
| 001 | PRESENTER A | PRESENTER | — | 8 |
| 002 | PARTICIPANT A | PARTICIPANT | NON-SYNC | 7 |
| 003 | PARTICIPANT B | PARTICIPANT | NON-SYNC | 9 |
| 004 | PARTICIPANT C | PARTICIPANT | SYNC | — |
| ... | ... | ... | ... | ... |

FIG.3

| TERMINAL ID | DISPLAY POSITION (PAGE NUMBER, ETC.) | RECEIVING DATE/TIME |
|---|---|---|
| 001 | 7 | 2015/2/24 11:05:55 |
|  | 8 | 2015/2/24 11:13:19 |
|  | 5 | 2015/2/24 11:21:08 |
|  | 9 | 2015/2/24 11:23:23 |
| 002 | ... | ... |
| ... | ... | ... |

FIG.4A

| USER ID | RANK | WEIGHT |
|---|---|---|
| PARTICIPANT A | HIGH | 0 |
| PARTICIPANT B | MIDDLE | 1 |
| PARTICIPANT C | LOW | 2 |
| ... | ... | ... |

FIG.4B

| USER ID | POSITION | WEIGHT |
|---|---|---|
| PARTICIPANT A | CHIEF DIRECTOR | 1 |
| PARTICIPANT B | DIRECTOR | 0 |
| PARTICIPANT C | DEPUTY DIRECTOR | 0 |
| ... | ... | ... |

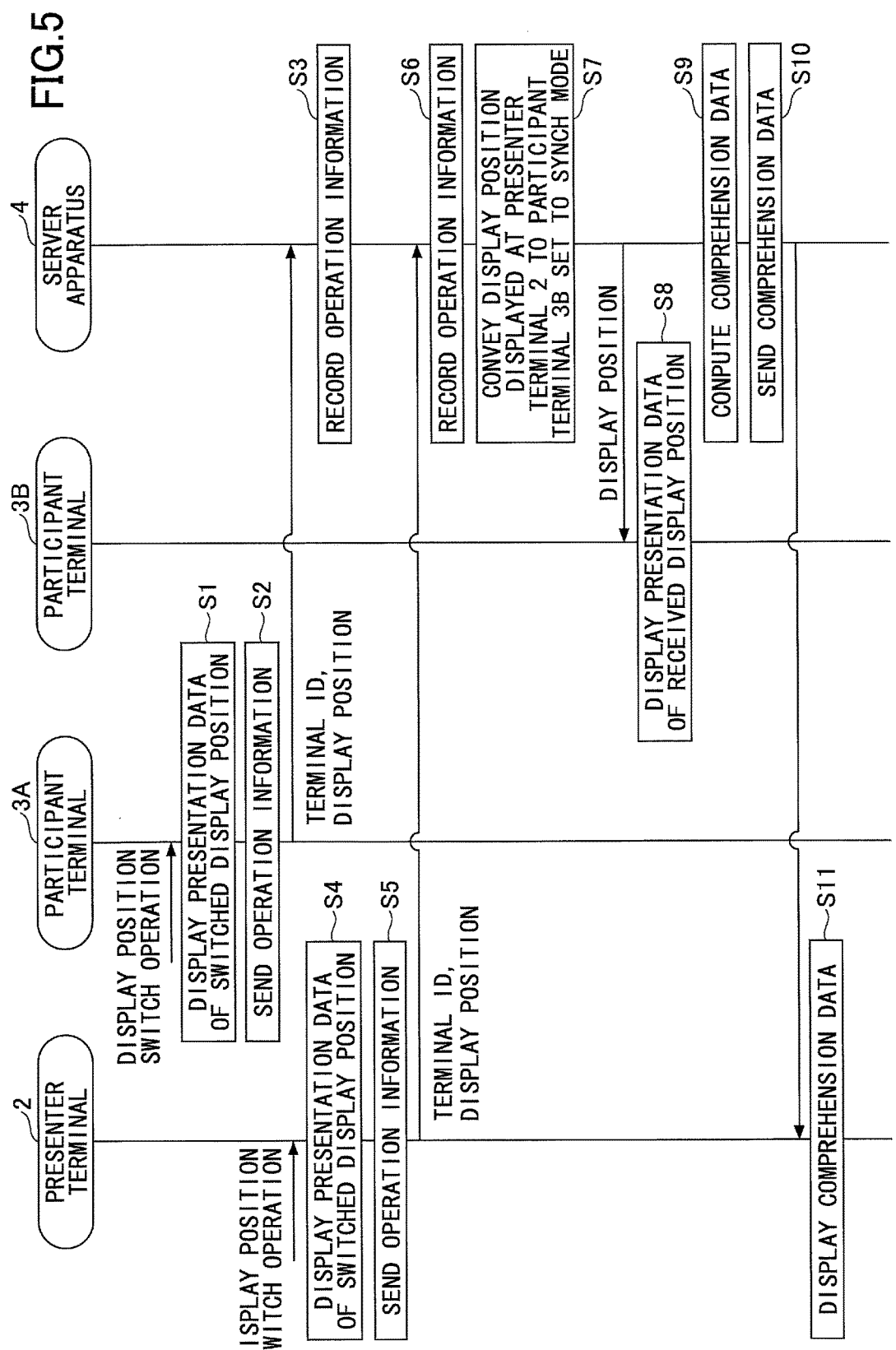

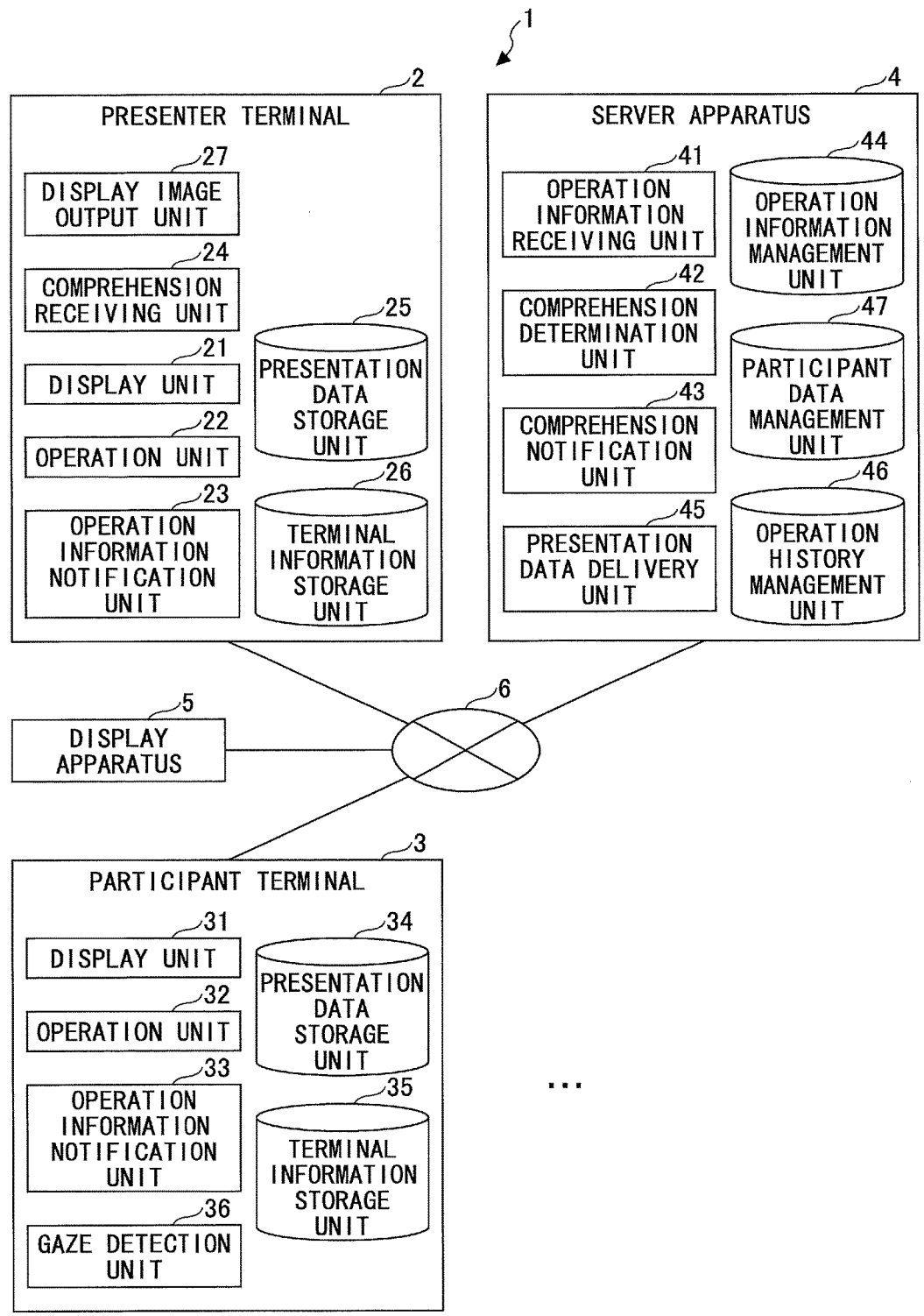

FIG.9

| TERMINAL ID | USER ID | USER TYPE | DISPLAY MODE | DISPLAY POSITION (PAGE NUMBER, ETC.) | GAZE INFORMATION |
|---|---|---|---|---|---|
| 001 | PRESENTER A | PRESENTER | - | 8 | - |
| 002 | PARTICIPANT A | PARTICIPANT | NON-SYNC | 8 | (6, 3) |
| 003 | PARTICIPANT B | PARTICIPANT | NON-SYNC | 8 | (7, 3) |
| 004 | PARTICIPANT C | PARTICIPANT | SYNC | - | (3, 2) |
| 005 | PARTICIPANT D | PARTICIPANT | NON-SYNC | 15 | ... |
| 006 | PARTICIPANT E | PARTICIPANT | NON-SYNC | 6 | ... |
| ... | ... | ... | ... | ... | ... |

FIG.10

| TERMINAL ID | DISPLAY POSITION (PAGE NUMBER, ETC.) | GAZE INFORMATION | RECEIVING DATE/TIME |
|---|---|---|---|
| 001 | 7 | (5, 6) | 2015/2/24 11:05:55 |
| | 7 | (6, 6) | 2015/2/24 11:06:00 |
| | ... | ... | ... |
| | 8 | (6, 3) | 2015/2/24 11:13:19 |
| 002 | ... | ... | ... |
| ... | ... | ... | ... |

CONFERENCING SYSTEM

BACKGROUND OF THE INVENTION

1. Field of the Invention

The present invention relates to a conferencing system.

2. Description of the Related Art

In recent years, information terminals such as tablets, smartphones, notebook PCs (personal computers) are becoming widespread, and a demand for conferencing systems utilizing such information terminals in a conference (presentation), such as a lecture or a class, is expected to increase. For example, a system may be envisioned in which a presenter at a conference uses a projector or an digital whiteboard to display presentation data, and participants of the conference are be able to view the presentation data on their own information terminals.

Japanese Laid-Open Patent Publication No. 2010-033229 describes an electronic conferencing system in which a first conference terminal (presenter terminal) notifies at least one second conference terminal (participant terminal) of a change in a display page position when a display page change operation has been implemented at the first conference terminal, and the second conference terminal changes a display page position displayed on its screen accordingly if it is set to sync mode, but does not change the display page position if it is set to non-sync mode.

However, according to the technique described in Japanese Laid-Open Patent Publication No. 2010-033229, when the second conference terminal is set to non-sync mode, the user of the second conference terminal is able to manually change the display page position. In such case, for example, a presenter giving a presentation may not be able to determine whether a participant is keeping up with the pace of the presentation. As such, the presenter may be unable to adjust the pacing of the presentation while giving the presentation.

SUMMARY OF THE INVENTION

It is an object of at least one embodiment of the present invention to provide a conferencing system that is capable of providing a presenter of a presentation with information for determining whether a participant is keeping up with the pace of the presentation.

According to one embodiment of the present invention, a conferencing system is provided that includes at least one first information terminal, a second information terminal, and an information processing apparatus. The information processing apparatus includes a receiving unit configured to receive a first display position corresponding to a current display position of content data displayed by the first information terminal. The second information terminal includes a display unit configured to display the content data and the first display position.

BRIEF DESCRIPTION OF THE DRAWINGS

FIG. 2 shows an example of an operation information management table according to the first embodiment;

FIG. 3 shows an example of an operation history management table according to the first embodiment;

FIGS. 4A and 4B show examples of a participant data management table;

FIG. 5 is a sequence chart showing an operation of the conferencing system according to the first embodiment;

FIG. 8 is a block diagram showing a configuration of the conferencing system according to a second embodiment of the present invention;

FIG. 9 shows an example of the operation information management table according to the second embodiment;

FIG. 10 shows an example of the operation history management table according to the second embodiment;

DESCRIPTION OF THE PREFERRED EMBODIMENTS

In the following, embodiments of the present invention are described with reference to the accompanying drawings.

First Embodiment

Figure 1:
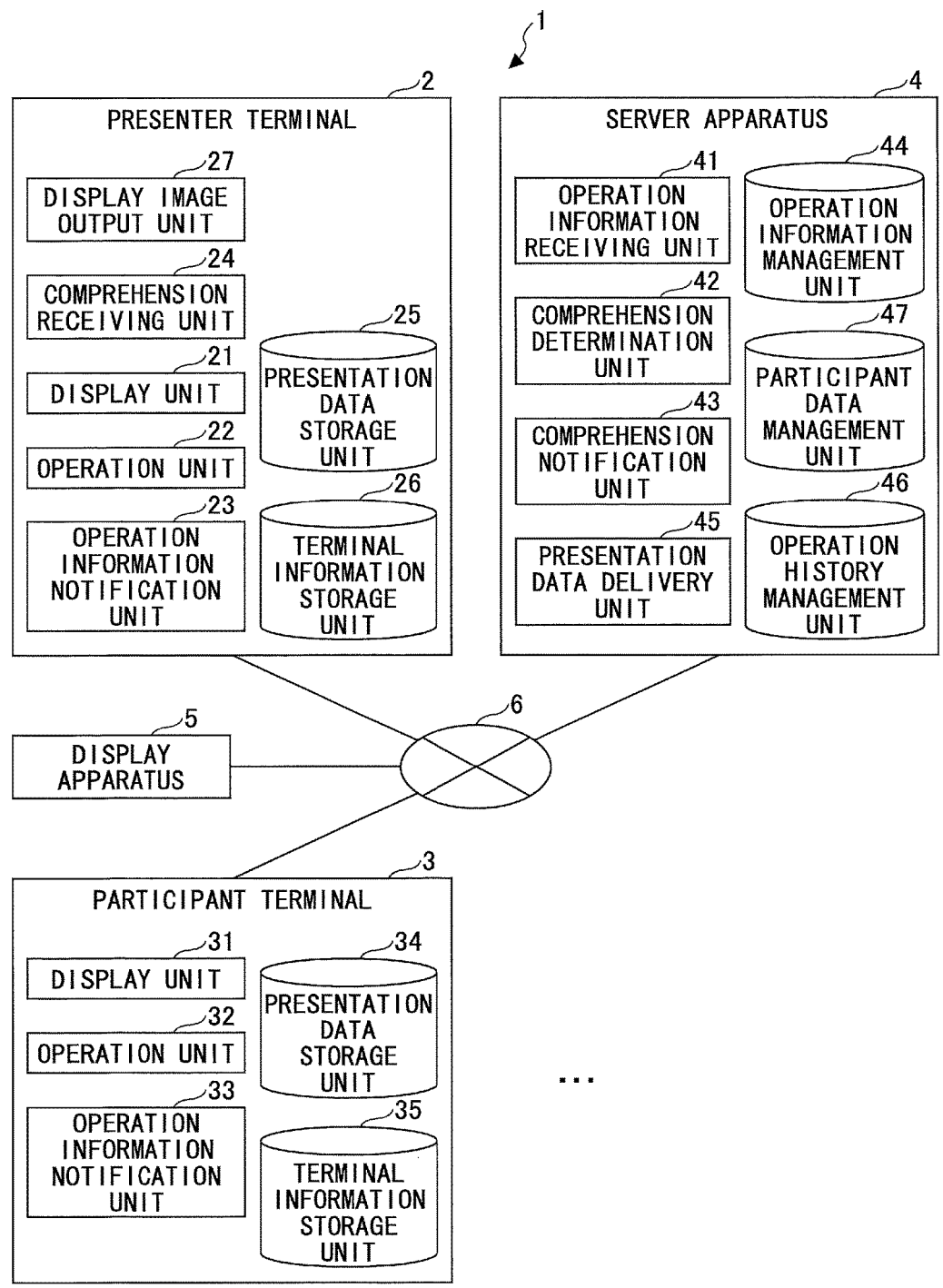
FIG. 1 is a block diagram showing a configuration of a conferencing system according to a first embodiment of the present invention.

FIG. 1 is a block diagram showing an example configuration of a conferencing system 1 according to a first embodiment of the present invention. The conferencing system 1 includes a presenter terminal 2 used by a presenter, at least one participant terminal 3 used by a participant, a server apparatus 4, and a display apparatus 5 that are connected by a network 6.

The presenter terminal 2 is an information terminal, such as a tablet, a smartphone, a notebook PC (personal computer), having a predetermined program installed therein. The presenter terminal 2 includes a display unit 21, an operation unit 22, an operation information notification unit 23, a comprehension receiving unit 24, a presentation data storage unit 25, a terminal information storage unit 26, and a display image output unit 27.

The presentation data storage unit 25 stores presentation data, such as a document file. The presentation data may be downloaded from the server apparatus 4 in advance, or the presentation data may be acquired from the server apparatus 4 each time in response to an operation input by a the user for switching a display position to a next display position (e.g., next page or next URL) or to a previous display position, for example.

The terminal information storage unit 26 stores a terminal ID identifying the presenter terminal 2 or the user of the presenter terminal 2 that is registered in advance.

The display unit 21 displays a screen displaying presentation data stored in the presentation data storage unit 25 or information received by the comprehension receiving unit 24, for example. In some embodiments, an image based on presentation data may be combined with an image based on comprehension data and the combined image may be displayed on the display unit 21, for example.

The operation unit 22 accepts an operation input by a user for switching a display position to a next display position of presentation data or to a previous display position, for example.

The operation information notification unit 23 transmits the terminal ID stored in the terminal information storage unit 26 and a display position of presentation data to be displayed on the display unit 21 to the server apparatus 4 in response to an operation of the operation unit 22 for switching the display position of presentation data displayed on the display unit 21.

The comprehension receiving unit 24 receives comprehension data from the server apparatus 4 and displays the received comprehension data on the display unit 21.

The display image output unit 27 outputs an image of the presentation data displayed on the display unit 21 to the display apparatus 5.

The participant terminal 3 may be an information terminal similar to the presenter terminal 2, and includes a display unit 31, an operation unit 32, an operation information notification unit 33, a presentation data storage unit 34, and a terminal information storage unit 35.

The operation unit 32 accepts an operation input by the user for switching a display position to a next display position of presentation data or to a previous display position, for example. The operation unit 32 also accepts an operation input by the user for specifying a display mode (sync mode/non-sync mode). That is, the user may operate the operation unit 32 to specify whether to have the display unit 31 display the same display position as that displayed on the display unit 21 of the presenter terminal 2.

The operation information notification unit 33, like the operation information notification unit 23 of the presenter terminal 2, transmits a terminal ID of the participant terminal 3 and a display position to be displayed on the display unit 31 to the server apparatus 4. The operation information notification unit 33 also transmits data specifying the display mode (sync mode/non-sync mode) along with the terminal ID stored in the terminal information storage unit 35 to the server apparatus 4. Note that in some embodiments, when the display mode is set to "sync mode" (i.e., when the display unit 31 is set up to display the same display position of presentation data as that displayed on the display unit 21 of the presenter terminal 2), the operation information notification unit 33 may refrain from transmitting the terminal ID and the display position to be displayed on the display unit 31 to the server apparatus 4, for example.

The server apparatus 4 may be an information processing apparatus, such as a personal computer, having a predetermined program installed therein, and includes an operation information receiving unit 41, a comprehension determination unit 42, a comprehension notification unit 43, an operation information management unit 44, a presentation data delivery unit 45, an operation history management unit 46, and a participant data management unit 47. Note that in some embodiments, a program for the server apparatus 4 may be installed in the presenter terminal 2 and the server apparatus 4 may be integrated with the presenter terminal 2, for example.

The operation information receiving unit 41 receives the terminal IDs and the display positions of presentation data to be displayed on the display units 21 and 31 from the information notification unit 23 of the presenter terminal 2 and the operation information notification unit 33 of the participant terminal 3. The operation information receiving unit 41 also receives data specifying the display mode (sync mode/non-sync mode) from the operation information notification unit 33 of the participant terminal 3.

FIG. 2 shows an example of an operation information management table stored in the operation information management unit 44 according to the first embodiment. In the operation information management table shown in FIG. 2, a user ID and user type information specifying whether the user is a presenter or a participant are registered in advance in association with a terminal ID. Also, a display mode and a display position of presentation data to be displayed are managed in association with the terminal ID. In the example of FIG. 2, a page number of the presentation data is used to indicate the display position.

When the operation information management unit 44 receives a display position of presentation data to be displayed and a terminal ID via the operation information receiving unit 41, the operation information management unit 44 records the received display position in association with the terminal ID. Also, when the operation information management unit 44 receives a terminal ID and data specifying the display mode via the operation information receiving unit 41, the operation information management unit 44 records the specified display mode (sync mode/non-sync mode) in association with the terminal ID.

The comprehension determination unit 42 computes comprehension data based on all display positions of presentation data registered in advance and the information stored in the operation information management table of FIG. 2 indicating the display position of the presentation data displayed by each participant terminal 3 and the display position of the presentation data displayed by the presenter terminal 2. The comprehension data includes the display position of each participant terminal 3 and the display position of the presenter terminal 2 in relation to all the display positions of the presentation data.

The comprehension notification unit 43 conveys the comprehension data computed by the comprehension determination unit 42 to the presenter terminal 2.

The presentation data delivery unit 45 delivers presentation data to the presenter terminal 2 and the participant terminal 3.

The display apparatus 5 may be a projector or a digital whiteboard, for example, and displays display information received from the presenter terminal 2 via the network 6.

FIG. 3 shows an example of an operation history management table stored in the operation history management unit 46 according to the first embodiment. The operation history management table shown in FIG. 3 manages a display position of presentation data that has been displayed by a terminal and a receiving date/time of the display position in association with a terminal ID.

When the operation history management unit 46 receives a display position of presentation data to be displayed and a terminal ID via the operation information receiving unit 41, the operation history management unit 46 records the display position and the receiving date/time of the display position received by the operation information receiving unit 41 in association with the terminal ID.

FIGS. 4A and 4B show examples of a participant data management table stored in the participant data management unit 47. The participant data management table may manage a user attribute, such as a rank or a position of the user, and a corresponding weight for the user attribute in association with a user ID, for example.

Note that information on the user attribute corresponding to each user ID may be acquired from another database server, for example.

The network 6 may be a wired LAN, a wireless LAN, the Internet, or a transmission network, such as a mobile phone network, for example.

FIG. 5 is a sequence chart showing an example operation of the conferencing system according to the first embodiment. Note that in the example of FIG. 5, participant terminals 3A and 3B respectively operated by participants A and B are included in the conferencing system.

When the participant A operates the operation unit 32 of the participant terminal 3A to switch a display position of presentation data to be displayed, the display unit 31 displays the corresponding display position (step S1), and the operation information notification unit 33 sends the terminal ID stored in the terminal information storage unit 35 and the display position to be displayed to the server apparatus 4 (step S2).

In turn, the operation information receiving unit 41 of the server apparatus 4 stores the terminal ID and the display position to be displayed (operation information) in the operation information management unit 44 (step S3).

When the presenter operating the presenter terminal 2 operates the operation unit 22 to switch a display position of presentation data to be displayed, the display unit 21 of the presenter terminal 2 displays the corresponding display position (step S4), the display image output unit 27 outputs and displays an image of the corresponding display position of the presentation data on the display apparatus 5, and the operation information notification unit 23 sends the terminal ID stored in the terminal information storage unit 35 and the display position to the server apparatus 4 (step S5).

In turn, the operation information receiving unit 41 of the server apparatus 4 stores the terminal ID and the display position (operation information) in the operation information management unit 44 (step S6) and conveys the display position received from the presenter terminal 2 to all the participant terminals 3 managed by the operation information management unit 44 that are set to "sync" mode in the operation information management table of FIG. 2 (participant terminal 3B in the present example) (step S7). In turn, the participant terminal 3B displays presentation data of the received display position on the display unit 31 (step S8).

The comprehension determination unit 42 of the server apparatus 4 may compute comprehension data periodically or upon receiving operation information from the presenter terminal 2 or the participant terminal 3, for example (step S9), and the comprehension notification unit 43 conveys the computed comprehension data to the presenter terminal 2 (step S10). In turn, the comprehension receiving unit 24 of the presenter terminal 2 displays the comprehension data received from the server apparatus on the display unit 21 (step S11).

Figure 6:
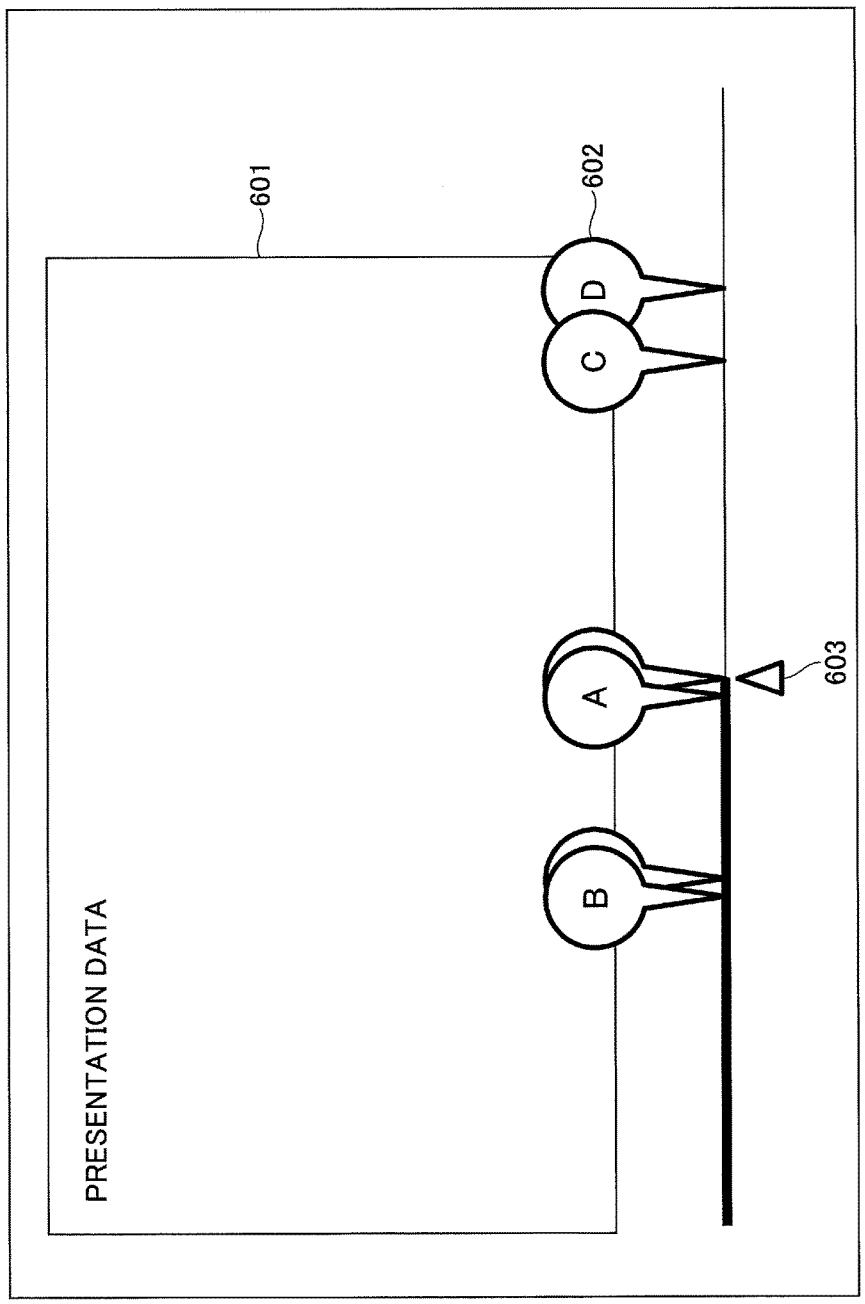
FIG. 6 shows an example of a display screen of a presenter terminal.

FIG. 6 shows an example of a display screen of the presenter terminal 2 displaying presentation data and comprehension data. In the display screen of FIG. 6, presentation data is displayed in a predetermined region 601 on the display unit 21 of the presenter terminal 2. Also, in the display screen of FIG. 6, the display positions of presentation data displayed by the participant terminals 3 in relation to all the display positions of the presentation data are indicated by indicators 602. Also, in the display screen of FIG. 6, the display position of presentation data displayed by the presenter terminal 2 in relation to all the display positions of the presentation data is indicated by a predetermined indicator 603.

In the example of FIG. 6, it can be appreciated that participant A is viewing the same display position as that displayed by the presenter (i.e., the participant terminal 3A is displaying the same display position as the presenter terminal 2). Also, it can be appreciated that participant B is viewing a previous display position with respect to the display position currently displayed by the presenter; i.e., participant B is viewing a display position of presentation data that has already been presented. This may suggest that participant B is unable to keep up with the pace of the presentation given by the presenter and is therefore viewing the previous display position to get a better understanding of the previously displayed presentation data, for example. On the other hand, it can be appreciated that participant C is viewing a next display position coming after the display position currently displayed by the presenter; i.e., participant C is moving ahead to a display position that is to be presented later on. This may suggest that participant C already understands the subject matter presented in the presentation and is therefore viewing the next display position, for example.

By displaying the display positions of presentation data displayed by the participant terminals 3 in real time as described above, the presenter may be able to instantly determine the comprehension level of the participants, for example.

Note that in some embodiments, indicators 602 may not have to be displayed for the participant terminals 3 of participants (e.g., participant A) that are viewing the presentation data in sync with the display switch operations of the presenter, for example. Also, in some embodiments, the comprehension data may also be displayed on the participant terminals 3 and/or the display apparatus 5, for example.

Figure 7:
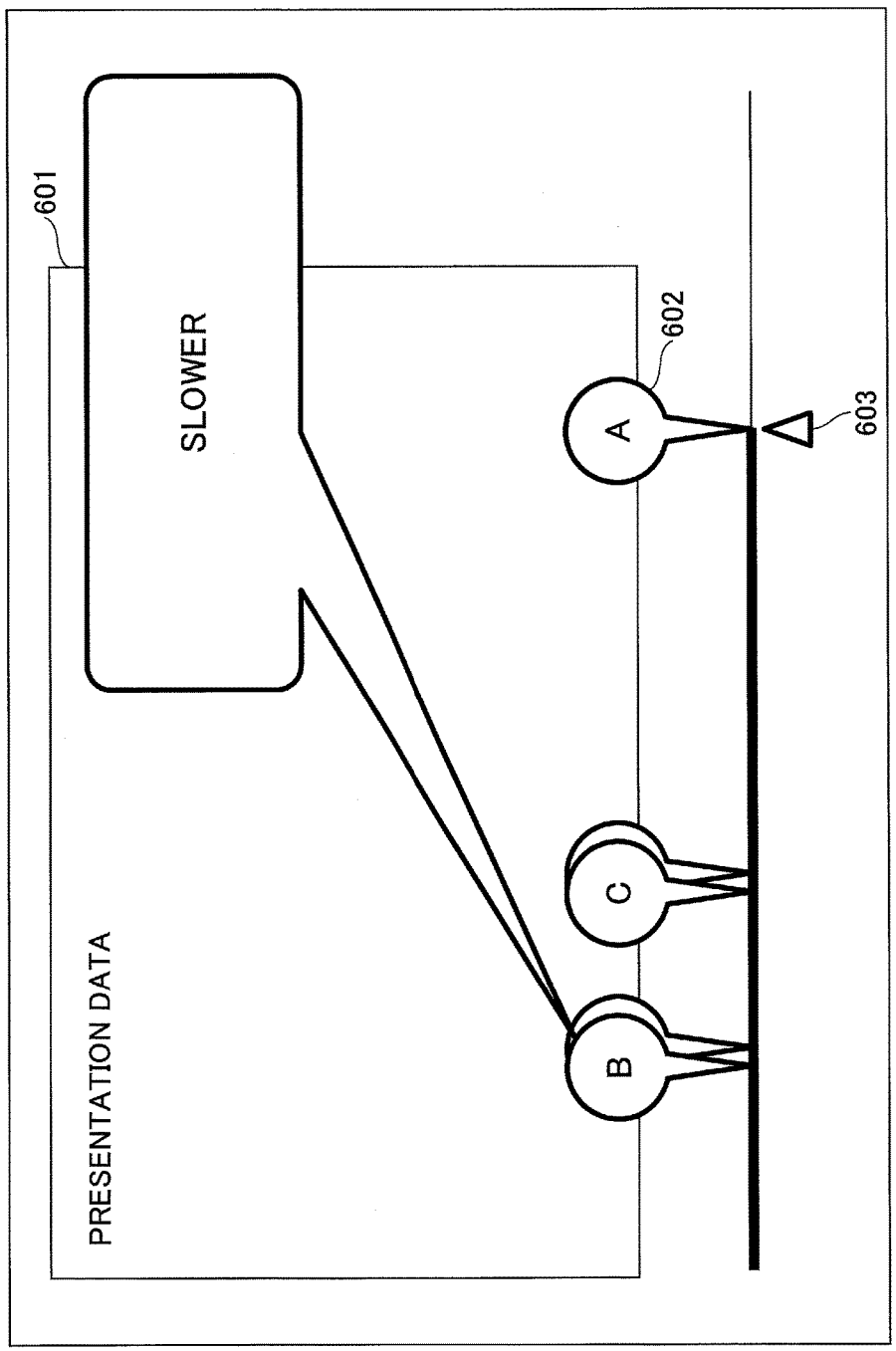
FIG. 7 shows an example of a screen displaying a warning to the presenter.

FIG. 7 shows an example of a display screen displaying a warning to the presenter when many of the participants are going back to a previous display position.

When more than a threshold number of participants are viewing a display position varying from (behind/ahead of) a currently displayed display position by at least a predetermined threshold; i.e., when the number of participants falling behind or moving ahead by more than a predetermined threshold with respect to the display position currently displayed by the presenter exceeds a predetermined threshold number, the comprehension determination unit 42 of the server apparatus 4 may display a warning on the display unit 21 of the presenter terminal 2 to advise the presenter to go "slower" or "faster", for example. In this way, for example, the presenter may become aware that a large number of participants are not keeping up with the pace of the presentation and adjust the pace of the presentation accordingly.

Note that in some embodiments, a warning, as described above, may be displayed when the ratio of the number of participants viewing a display position varying from the current display position by at least a predetermined threshold to a total number of participants, or a number of participant terminals 3 set to sync mode, exceeds a predetermined ratio, for example.

Also, in some embodiments, the comprehension determination unit 42 of the server apparatus 4 may estimate the time period required to finish reading content displayed at each display position based on the number of characters included in each display position. Based on such estimated time period, the comprehension determination unit 42 may refrain from displaying a warning until the estimated time period has elapsed from the time the presenter started displaying a display position even when the presenter inputs an operation for switching the display position to a next display position, for example. Note that presentation data may often include charts and/or images, and as such, a character recognition process may be performed on each display position to count the number of characters included in each display position, for example. When presentation data includes a display position with a large number of characters, the participants may need a certain period of time to finish reading the characters included in the display position. Thus, when the presenter inputs an operation to switch to a next display position immediately after displaying such display position, the participants may need more time before switching to the next display position and may therefore delay the operation for switching to the next display position. In such case, the comprehension determination unit 42 of the server apparatus 4 may refrain from displaying the warning on the presenter terminal 2, for example.

Also, in some embodiments, the server apparatus 4 may store a display position of presentation data in association with a warning that was displayed while displaying the presentation data of the corresponding display position in a previous presentation, for example. Then, when giving the presentation again, the warning that is stored in association with the corresponding display position may be displayed upon displaying the presentation data of the corresponding display position on the presentation terminal 2. In this way, for example, a warning to "speed up" may be issued to the presenter upon displaying a display position corresponding to where many participants moved ahead when the presentation was previously given.

Also, the comprehension determination unit 42 may compute comprehension data in view of the weight assigned to each participant in the participant data management table of FIG. 4A or 4B, for example.

For example, in FIG. 4A, a weight of 0 is assigned to participant A with a high performance rank (e.g. grade). Based on such weight information, the comprehension determination unit 42 may refrain from displaying an indicator for indicating the comprehension level of such participant, or disregard the comprehension level of such participant in determining whether to display a warning as described above, for example.

Also, in FIG. 4A, a weight of 1 is assigned to participant B with a middle performance rank, and a weight of 2 is assigned to participant C with a low performance rank. Based on such weight information, for example, the comprehension determination unit 42 may double the number or size of an indicator for the participant with the low performance rank as compared to the number or size of an indicator for the participant with the middle performance rank in computing the comprehension data. Also, in determining whether to display a warning as described above, weighting may be performed in computing the number of participants viewing a display position varying from a current display position by at least a predetermined threshold based on the weight assigned to each participant. For example, the number of participants with the low performance rank may be counted twice as many as the number of participants with the middle performance rank. In this way, emphasis may be placed on the comprehension of participants with a low performance rank in considering whether to display a warning, for example.

Also, in some embodiments, the server apparatus 4 may generate a list indicating the performance rank of each participant and a view time of each participant viewing each display position, for example, and the server apparatus 4 may send the generated list to the presenter terminal 2 and the participant terminals 3. In this way, for example, it may be determined whether a participant has moved ahead after understanding the presentation data of a display position, or whether the participant has moved ahead without completely understanding the presentation data of the display position. Thus, the presenter and/or the participants may be able to determine portions of the presentation that they had trouble understanding, for example.

Also, in a corporate meeting, for example, the comprehension determination unit 42 may assign a weight to each participant based on the position (e.g. title) of each participant as shown in FIG. 4B, and the comprehension determination unit 42 may compute comprehension data based on the weight assigned to each participant. For example, in FIG. 4B, a weight of 0 is assigned to participants other than the chief director having decision making authority. Based on such weight information, the comprehension determination unit 42 may refrain from displaying an indicator for indicating the comprehension level of the participants with a weigh of 0, or disregard the comprehension level of such participants in determining whether to display a warning as described above, for example. In this way, the presenter may proceed with the presentation based on the viewing speed of the chief director corresponding to the decision maker (display position of presentation data displayed by the participant terminal 3A of participant A in the present example).

Also, in some embodiments, after the operation information receiving unit 41 receives a terminal ID and a display position from the operation information notification unit 23 of the presenter terminal 2, the comprehension determination unit 42 may extract and identify, based on the operation history management table of FIG. 3, a participant terminal 3 that has not transmitted a terminal ID and a display position to the server apparatus 4 within a predetermined time period. The comprehension determination unit 42 may then refrain from displaying an indicator for such participant terminal 3 and disregard the display position displayed by such participant terminal 3 in determining whether to issue a warning as described above, for example. In this way, for example, participants that are presumably viewing the display apparatus 5 rather than operating their participant terminals 3 to view the presentation data may be excluded from consideration in computing the comprehension data.

Second Embodiment

According to a second embodiment of the present invention, a portion of presentation data that is being viewed (gazed) by a participant on his/her participant terminal 3 is detected, and the detected gaze information is displayed on the presenter terminal 2. In this way, the presenter may be able to identify information in the presentation data that may be of interest to the participant or information that the participant may have trouble understanding, for example.

FIG. 8 is a block diagram showing a conferencing system according to the second embodiment. In the conferencing system according to the second embodiment, the participant terminal 3 includes a gaze detection unit 36 in addition to the elements of the participant terminal 3 according to the first embodiment.

The gaze detection unit 36 may use a camera to capture the gaze of a participant, for example, and detect gaze information relating to a gaze position within presentation data that is being viewed (gazed) by the participant. Note that a conventional technique, which is not described in detail herein, may be used to detect the gaze of the participant. For example, the gaze of the participant may be detected based on the position of the iris relative to the inner corner of the eye.

Also, the operation information notification unit 33 of the participant terminal 3 according to the present embodiment may notify the server apparatus 4 of the detected gaze information together with the terminal ID at periodic time intervals or in response to an operation for switching the display position of presentation data displayed by the participant terminal 3, for example.

Also, the operation information receiving unit 41 of the server apparatus 4 according to the present embodiment receives the terminal ID, the display position, and the gaze information from the operation information notification unit 33 of the participant terminal 3.

FIG. 9 shows an example of the operation information management table managed by the operation information management unit 44 according to the second embodiment. The operation information management table of FIG. 9 also manages gaze information in association with a terminal ID. When the operation information management unit 44 receives the terminal ID and the gaze information via the operation information receiving unit 41, the operation information management unit 44 records the gaze in association with the received terminal ID in the operation information management table.

The comprehension determination unit 42 of the server apparatus 4 according to the second embodiment extracts, based on information stored in the operation information management table of FIG. 9, the terminal ID and the gaze information of participants viewing the same display position as that displayed by the presenter and reflects the extracted information in the comprehension data. Note that in the example of FIG. 9, participants viewing the same display position as that displayed by the presenter include participants A and B that are viewing the same display position ("8") as that displayed by the user indicated as "presenter", and participant C using participant terminal 3 that is set to "sync" mode.

FIG. 10 shows an example of the operation history management table managed by the operation history management unit 46 according to the second embodiment. The operation history management table of FIG. 10 also manages gaze information in association with a terminal ID.

When the operation history management unit 46 receives the terminal ID, the display position, and the gaze information received by the operation information receiving unit 41, the operation history management unit 46 records the display position, the gaze information, and the receiving date/time when the information was received by the operation information receiving unit 41 in association with the terminal ID.

Figure 11:
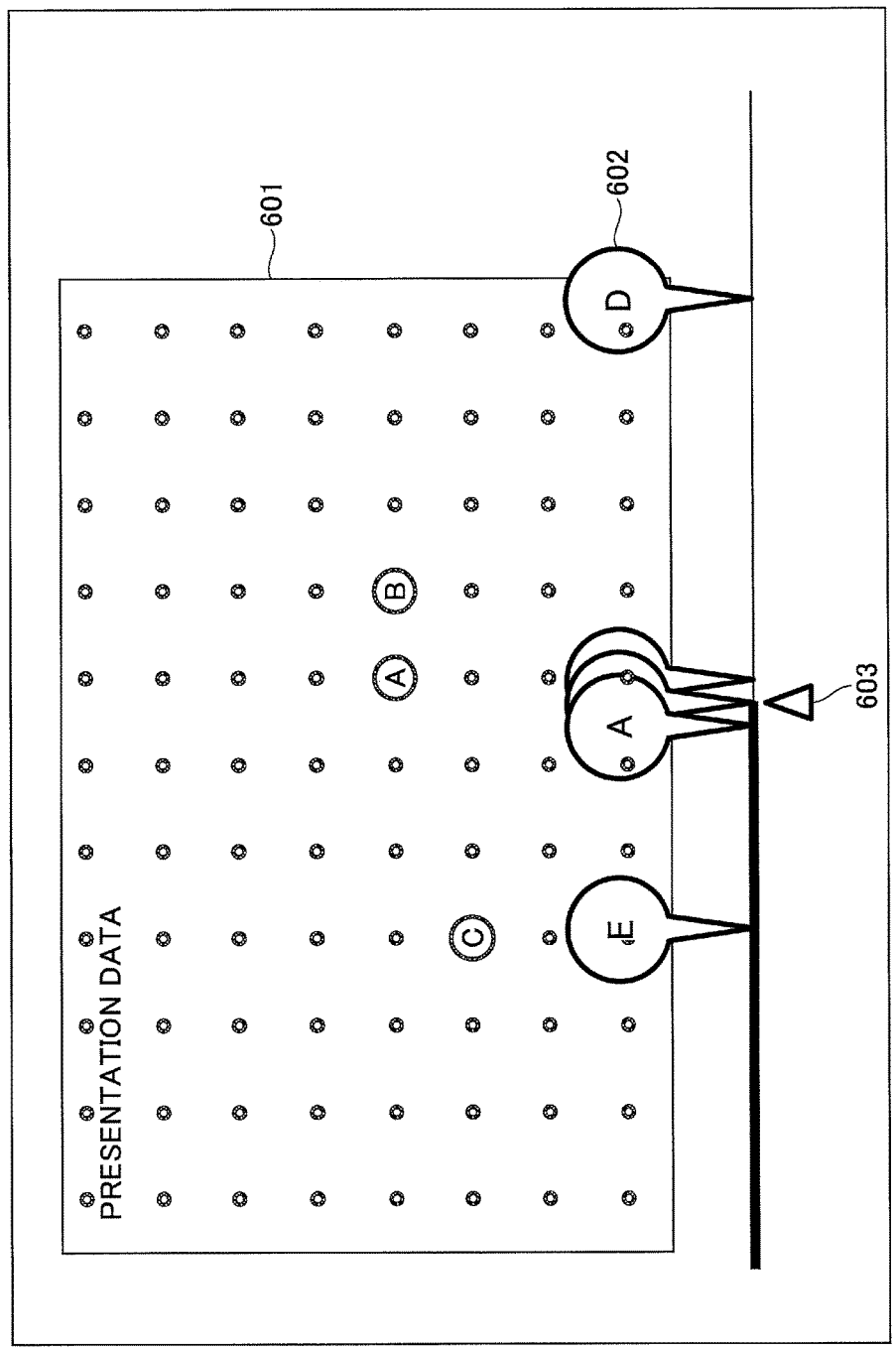
FIG. 11 shows a first example of a display screen displayed by the presenter terminal according to the second embodiment.

FIG. 11 shows a first example of a display screen displaying presentation data and comprehension data on the terminal apparatus 2 according to the second embodiment. As in the first embodiment, presentation data is displayed in a predetermined region 601 of the display screen displayed on the display unit 21 of the presenter terminal 2. Also, in the display screen of FIG. 11, the display positions of presentation data displayed by the participant terminals 3 in relation to all the display positions of the presentation data are indicated by indicators 602. Also, in the display screen of FIG. 11, the display position of presentation data displayed by the presenter terminal 2 in relation to all the display positions of the presentation data is indicated by a predetermined indicator 603.

Further, in the second embodiment, the gaze information of each participant viewing the same display position as that displayed by the presenter is superimposed and displayed on the presentation data.

Note that FIG. 11 shows an example in which the region 601 displaying the presentation data is divided into 8 areas in the vertical direction and 11 areas in the horizontal direction, and a center position of the area at the bottom left corner of the region 601 is set up as the origin (0, 0). In the operation information management table of FIG. 9, the gaze information of participant A is set to (6,3), the gaze information of participant B is set to (7,3), and the gaze information of participant C is set to (3,2). Based on such gaze information, the areas being viewed (gazed) by the participants A-C are indicated at the corresponding coordinate positions in FIG. 11. In this way, the presenter may be able to check the areas being viewed by the participants while giving the presentation, for example.

Figure 12:
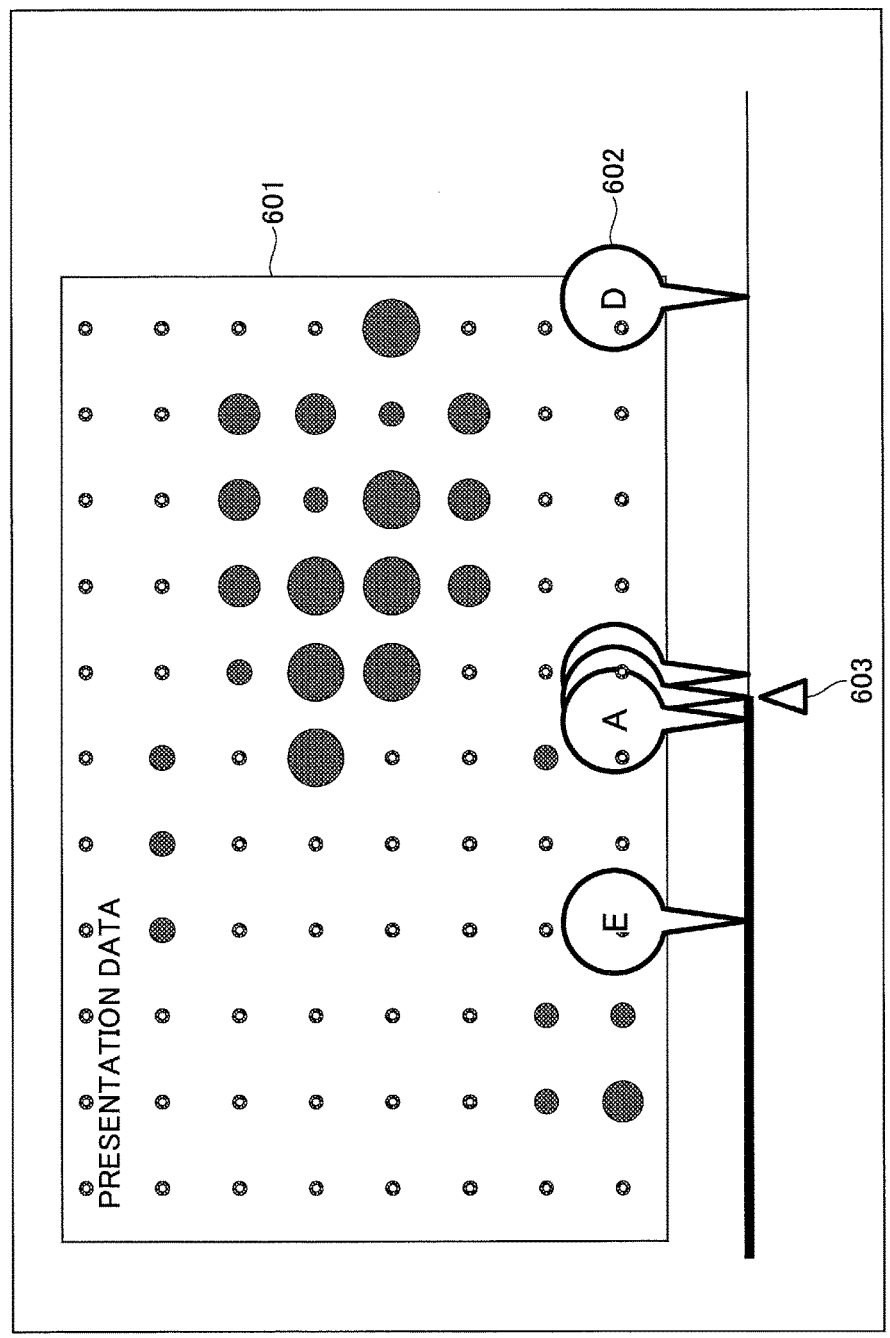
FIG. 12 shows a second example of a display screen displayed by the presenter terminal according to the second embodiment.

FIG. 12 shows a second example of a display screen displaying presentation data and comprehension data on the presenter terminal 2 according to the second embodiment. In the region 601 displaying the presentation data of the display screen of FIG. 12, a mark is displayed on each area corresponding to the gaze information of one or more participants, and the size of each mark is adjusted according to the number of participants viewing (gazing) the corresponding area.

For example, in a case where a relatively large number of participants are viewing the same display position as that displayed by the presenter, as shown in FIG. 12, a large mark may be superimposed on an area that is being (viewed) gazed by a large proportion of the participants viewing the same display position.

Also, based on operation history information stored in the operation history information management table of FIG. 10, for example, when an operation for switching the display position displayed by the presenter terminal 2 is input, the server apparatus 4 may display presentation data of the switched display position in the region 601 and adjust the size of a mark to be displayed on an area corresponding to gaze information based on the number of records of the gaze information stored in the operation history information management table in association with all participant terminals 3 or one or more specific participant terminals 3, for example. In this way, the size of a mark to be displayed on an area corresponding to gaze information may be adjusted based on the cumulative period of time or cumulative number of times the area has been viewed (gazed) by the participants, and a large mark may be superimposed and displayed on an area that has been viewed (gazed) for a long time or many times, for example.

Also, the comprehension determination unit 42 according to the second embodiment may compute comprehension data that includes gaze information based on a weight assigned to each participant in the participant data management table as shown in FIG. 4A or 4B, for example. As described above in connection with the first embodiment, for example, the comprehension determination unit 42 may take into account the weight 0 assigned to a participant with a high performance rank (e.g. grade) in computing comprehension data, and refrain from displaying gaze information of such participant.

Further, in some embodiments, another display region, such as a sub-screen, for displaying presentation data of another display position other than the display position of presentation data output by the display apparatus 5 may be displayed on the presenter terminal 2, and gaze information relating to a gaze position within the presentation data of the other display position may be superimposed and displayed on the presentation data displayed in the other display region, for example. In this way, gaze information of participants viewing a page other than the page being presented may be displayed, for example.

Modified Examples

Note that in some embodiments, the server apparatus 4 may be able to reproduce the comprehension data based on operation history information stored in the operation history management table. In this way, the presenter may utilize the comprehension data to improve his/her presentation or to practice the presentation at a later date, for example.

Also, in some embodiments, an image based on presentation data and an image based on comprehension data may be combined at the server apparatus 4, and the combined image may be delivered from the presentation data delivery unit 45 to the presenter terminal 2 through streaming delivery. In this way, information on operations on the participant terminals 3 and the gaze of participants may be displayed on the presenter terminal 2 in real time, for example.

Also, in a case where multiple files are used as presentation data, a file ID identifying a file and a page number may be used as the display position in computing the comprehension data, for example.

Also, in a case where the presentation data is a web page, URL information may be used as the display position, for example.

Also, in a case where a page of presentation data is too large to be displayed within one screen page such that the page of presentation has to be scrolled, a scroll position may be used as the display position in computing the comprehension data, for example.

Also, in some embodiments, the server apparatus 4 may be configured by a plurality of servers and a function of the server apparatus 4 may be provided in any server, for example. Also, the functions of the server apparatus 4 may be provided in the presenter terminal 2, and the presenter terminal 2, as a master terminal, may be connected a plurality of participant terminals 3 corresponding to slave terminals, for example.

Note that the above-described system configuration including the presenter terminal 2, the participant terminal 3, and the server apparatus 4 is merely one example configuration, and the present invention may be implemented in various other system configurations.

<Hardware Configuration>

Figure 13:
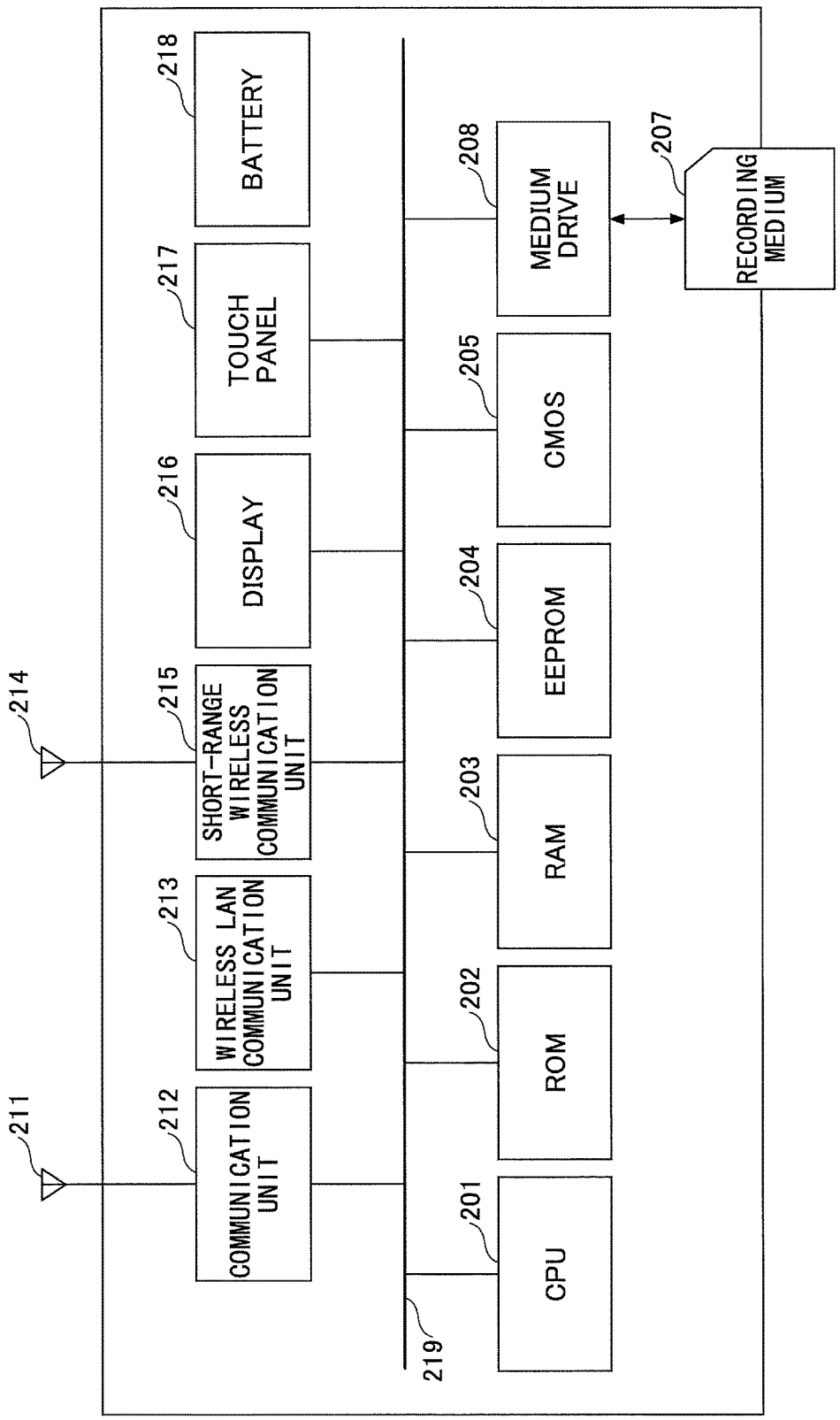
FIG. 13 is a block diagram showing an example hardware configuration the presenter terminal and a participant terminal.

The presenter terminal 2, the participant terminal 3 may be implemented by a hardware configuration as shown in FIG. 13, for example. FIG. 13 shows an example hardware configuration of the presenter terminal 2 or the audience terminal 3 (hereinafter also referred to as "terminal") according to the present embodiment. The terminal shown in FIG. 13 includes a CPU 201, a ROM 202, a RAM 203, an EEPROM 204, a CMOS sensor 205, and a medium drive 208.

The CPU 201 controls the overall operation of the terminal. The ROM 202 stores a basic input output program. The RAM 203 is used as a working area for the CPU 201. The EEPROM 204 performs data read/write operations under control of the CPU 201. The CMOS sensor 205 acquires image data by capturing an image of an imaging object under control of the CPU 201.

The medium drive 208 controls data read/write (storage) operations with respect to a recording medium 207 such as a flash memory. The recording medium 207, from which data may be read by the media drive 308, or on which new data may be written and stored by the medium drive 208, is arranged to be freely detachable from the medium drive 208.

Note that the EEPROM 204 may store an OS that is executed by the CPU 201, and association information necessary for network settings, for example. Also, applications for executing the various processes according to embodiments of the present invention may be stored in the EEPROM 204 or the recording medium 207, for example.

The CMOS sensor 205 is a charge-coupled device for digitizing an image of an imaging object by converting light into an electrical charge. The CMOS sensor 205 may be any imaging device that is capable of capturing an image of an imaging object such as a CCD (Charge Coupled Device) sensor, for example.

The terminal shown in FIG. 13 further includes an antenna 211, a communication unit 212, a wireless LAN communication unit 213, a short-range wireless communication antenna 214, a short-range wireless communication unit 215, a display 216, a touch panel 217, and a bus line 219.

The communication unit 212 communicates with a nearby base station apparatus through radio communication signals using the antenna 211. The wireless LAN communication unit 213 establishes wireless LAN communication with an access point based on the IEEE 80411 standard, for example. The short-range wireless communication unit 215 establishes short-range wireless communication using the short-range wireless communication antenna 214.

The display 216 may be a liquid crystal display or an organic EL display for displaying an image of an imaging object and/or various icons, for example. The touch panel 217 is placed on the display 216 and may be implemented by a pressure-sensitive panel or an electrostatic panel that detects a touch position on the display 216 when the touch panel 217 is touched by a finger or a touch pen, for example. The bus line 219 may be an address bus or a data bus for electrically connecting the above units, for example.

The terminal shown in FIG. 13 further includes a dedicated battery 218. The terminal is driven by the battery 218.

With the above hardware configuration, the presenter terminal 2 and the participant terminal 3 may implement the various processes according to embodiments of the present invention as described above, for example.

Figure 14:
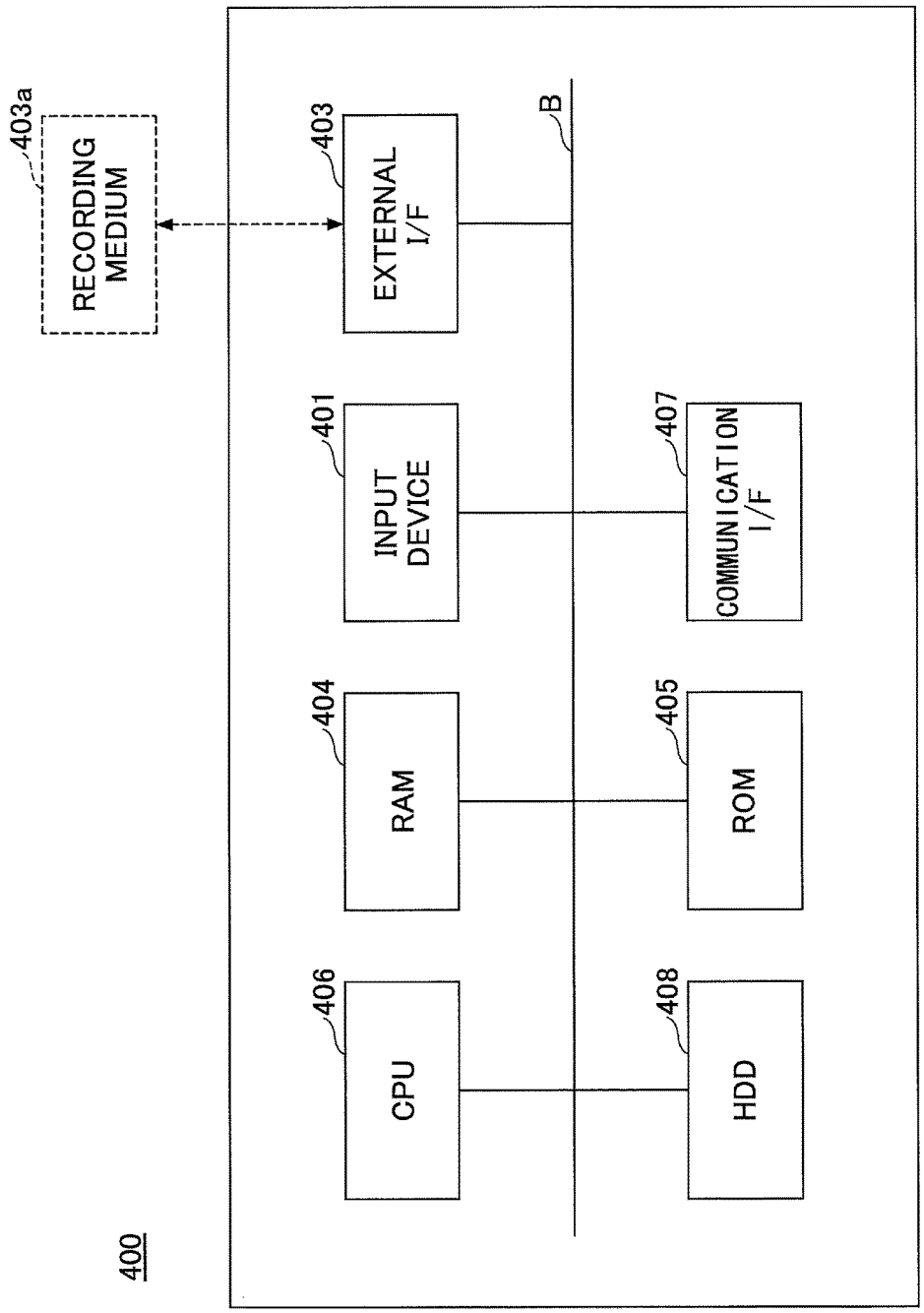
FIG. 14 is a block diagram showing an example hardware configuration of a server apparatus.

The server apparatus 4 may be implemented by a computer system having a hardware configuration as shown in FIG. 14, for example. FIG. 14 shows an example hardware configuration of a computer system 400 according to the present embodiment.

The computer system 400 shown in FIG. 14 includes an input device 401, an external I/F 403, a RAM 404, a ROM 404, a CPU 406, a communication I/F 407, and a HDD 408 that are connected to one another by a bus B. The input device 401 may include a keyboard and a mouse, for example, and is used to input operation signals to the computer system 400.

The HDD 408 is a nonvolatile storage device that stores programs and data. The programs and data stored in the HDD 408 may include an OS (Operating System) corresponding to basic software for controlling the entire computer system 400 and application programs for providing various functions in the OS, for example. The HDD 408 may manage the programs and data stored therein by a predetermined file system and/or a DB (database), for example.

The external I/F 403 is an interface with an external device. The external device may be a recording medium 403a, for example. In this way, the computer system 400 may perform data read/write operations with respect to the recording medium 403a via the external I/F 403, for example. The recording medium 403a may be implemented by a flexible disk, a CD, a DVD (Digital Versatile Disk), an SD memory card, a USB (Universal Serial Bus) memory, or the like.

The ROM 405 is a non-volatile semiconductor memory (storage device) that is capable of retaining programs and data stored therein even when the power is turned off. The ROM 405 stores programs and data including a BIOS (Basic Input/Output System) that is executed upon starting the computer system 400, OS settings, and network settings, for example. The RAM 404 is a volatile semiconductor memory (storage device) for temporarily storing programs and data.

The CPU 406 is a computing unit that reads a program and/or data from a storage device such as the ROM 405 or the HDD 408 and loads the read program and/or data in the RAM 404 to execute a relevant process. In this way, the CPU 406 may perform overall control of the computer system 400 and implement various functions of the computer system 400.

The computer system 400 according to the present embodiment may implement the various processes as described above through the cooperation of the above-described hardware resources with programs/data, for example.

Although the present invention has been described above with reference to certain illustrative embodiments, the present invention is not limited to these embodiments, and numerous variations and modifications may be made without departing from the scope of the present invention.

The present application is based on and claims the benefit of priority of Japanese Patent Application No. 2015-058023 filed on Mar. 20, 2015, the entire contents of which are hereby incorporated by reference.

What is claimed is:

1. A conferencing system comprising:
a plurality of information terminals that include
a display,
an image capturing device,
a first processor, and
a first memory storing program instructions that cause the first processor to:
control the image capturing device to detect gaze position information that indicates a gaze position, being viewed by a user, within a first display position of content data displayed on the display of at least one first information terminal from among the plurality of information terminals; and
an information processing apparatus that includes
a second processor, and
a second memory storing program instructions that causes the second processor to:
receive first display position information that indicates the first display position of the content data as displayed on the display of the at least one first information terminal,
receive the detected gaze position information from the at least one first information terminal, and
send the received first display position information and the gaze position information to a second information terminal from among the plurality of information terminals,
wherein the content data, the first display position information, and the gaze position information are displayed on the display of the second information terminal,
the program instructions further cause the second processor to determine whether to convey warning information to the second information terminal based on the first display position information and second display position information that indicates a second display position of the content data as displayed by the second information terminal,
the warning information is conveyed from the information processing apparatus and displayed at the display of the second information terminal in a case where the second processor determines that the warning information is to be conveyed to the second information terminal, and
the information processing apparatus further associates the first display position information with the warning information from a display of the first display position, stores the first display position information in association with the warning information, and conveys the warning information to the second information terminal upon a subsequent display of the first display position.

2. The conferencing system according to claim 1, wherein the second processor determines that the warning information is to be conveyed in a case where a predetermined threshold value of the at least one first information terminal that displays the first display position of the content data varying from the second display position by at least a predetermined value is exceeded.

3. The conferencing system according to claim 1, wherein the second processor determines that the warning information is to be conveyed in a case where a ratio of a number of the at least one first information terminal that displays the first display position of the content data varying from the second display position by at least a predetermined value to a total number of the at least one first information terminal is exceeded.

4. The conferencing system according to claim 2, wherein the program instructions further cause the second processor to
refrain from counting the at least one first information terminal that does not change the first display position even after a predetermined time period has elapsed from a time the second display position is changed.

5. The conferencing system according to claim 1, wherein the program instructions further cause the second processor to
determine whether to convey the warning information after a predetermined time period has elapsed from a time the second display position is displayed by the second information terminal, the predetermined time period being based on a number of characters included in the second display position.

6. The conferencing system according to claim 1, wherein the program instructions further cause the second processor to
determine whether to convey the warning information based on an attribute of a user of the at least one first information terminal.

7. The conferencing system according to claim 1, wherein when the first display position information coincides with second display position information that indicates a second display position of the content data as displayed on the display of the second information terminal, the display of the second information terminal superimposes and displays information identifying the at least one first information terminal on a position corresponding to the gaze information within the content data displayed by the second information terminal.

8. The conferencing system according to claim 1, wherein the display of the second information terminal displays the gaze information at a position corresponding to the gaze information within the content data displayed by the second information terminal, based on a number of the at least one first information terminal detected with the gaze information corresponding to the position.

9. The conferencing system according to claim 1, wherein the information processing apparatus is separate from the second information terminal, and includes a delivery unit configured to combine an image based on the content data and an image based on the first display position and deliver the combined image to the second information terminal through streaming delivery.

10. A conferencing system comprising:
a plurality of information terminals that include
  a display,
  an image capturing device,
  a first processor, and
  a first memory storing program instructions that cause the first processor to:
    control the image capturing device to detect gaze position information that indicates a gaze position, being viewed by a user, within a first display position of content data displayed on the display of at least one first information terminal from among the plurality of information terminals; and
an information processing apparatus that includes
  a second processor, and
  a second memory storing program instructions that cause the second processor to:
    determine whether to convey warning information to a second information terminal from among the plurality of information terminals based on first display position information that indicates a first display position of content data as displayed on the display of the at least one first information terminal, and second display position information that indicates a second display position of the content data as displayed on the display of the second information terminal,
wherein
  the warning information is conveyed from the information processing apparatus and displayed on the display of the second information terminal in a case where the second processor determines that the warning information is to be conveyed to the second information terminal, and
wherein
  the content data, the first display position information, and the gaze position information are displayed on the display of the second information terminal,
  the program instructions further cause the second processor to determine whether to convey warning information to the second information terminal based on the first display position information and second display position information that indicates a second display position of the content data as displayed by the second information terminal,
  the warning information is conveyed from the information processing apparatus and displayed at the display of the second information terminal in a case where the second processor determines that the warning information is to be conveyed to the second information terminal, and
  the information processing apparatus further associates the first display position information with the warning information from displays of the first display position, stores the first display position information in association with the warning information, and conveys the warning information to the second information terminal upon a subsequent display of the first display position.

* * * * *